United States Patent [19]

Amoraal

[11] Patent Number: 5,570,820
[45] Date of Patent: Nov. 5, 1996

[54] LIQUID DOSING DEVICE

[75] Inventor: Hendrik J. Amoraal, Benoni, South Africa

[73] Assignee: Flowreg CC, Transvaal, South Africa

[21] Appl. No.: 155,843

[22] Filed: Nov. 23, 1993

[51] Int. Cl.⁶ ............................................. B67D 5/06
[52] U.S. Cl. .................... 222/205; 222/211; 222/212
[58] Field of Search ................................... 222/207, 211, 222/212, 568, 205

[56] References Cited

U.S. PATENT DOCUMENTS

| 3,241,724 | 3/1966 | Lerner | 222/211 X |
| 5,377,880 | 1/1995 | Moretti | 222/207 |

FOREIGN PATENT DOCUMENTS

| 2637366 | 4/1990 | France | 222/207 |
| 2009926 | 10/1971 | Germany | 222/207 |
| 2067517 | 7/1981 | United Kingdom | 222/207 |
| 2133774 | 8/1984 | United Kingdom | 222/207 |

Primary Examiner—Andres Kashnikow
Assistant Examiner—Joseph A. Kaufman
Attorney, Agent, or Firm—Burns, Doane, Swecker & Mathis

[57] ABSTRACT

This invention relates to a liquid dosing device for locating on a container. The device has a chamber with an aperture therein to allow liquid out the chamber. A spout extends through a wall of the chamber and has a first end located toward the top of the chamber and a second end extending beyond the wall of the chamber for locating inside the container. The device also has a valve arrangement which comprises a cap and a holding structure to move the cap between a storage position whereby the cap is held in sealing contact with the first end of the spout and an operative condition whereby the cap is held off the first end of the spout to allow liquid exiting the first end of the spout into the chamber.

7 Claims, 1 Drawing Sheet

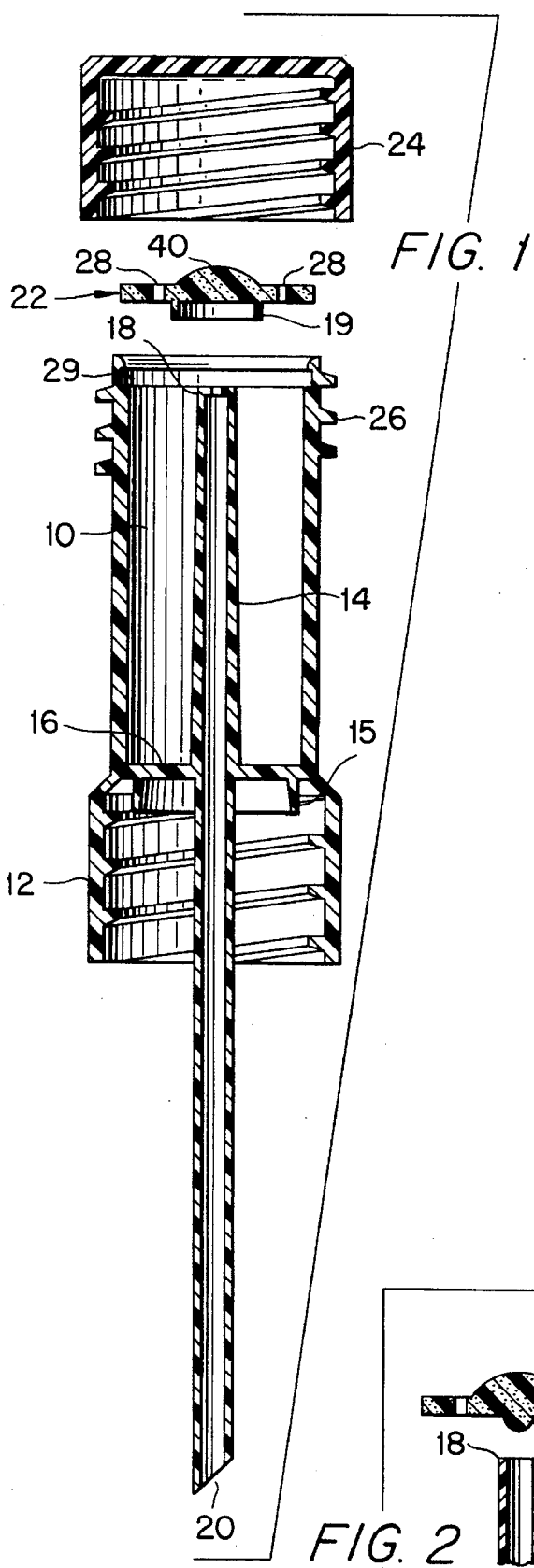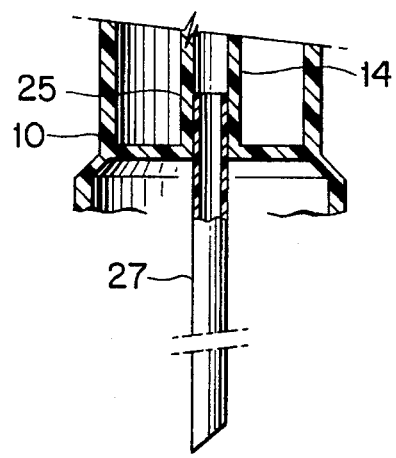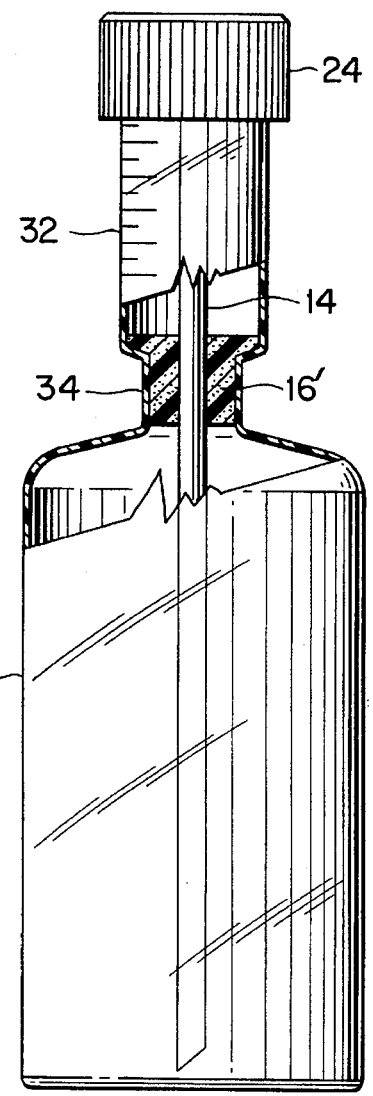

LIQUID DOSING DEVICE

BACKGROUND OF THE INVENTION

THIS invention relates to a liquid dosing device.

When a particular dose of liquid is required for a specific application, the usual procedure is to pour the liquid out of a container into a measuring receptacle until the required dose is obtained. This procedure often results in spillage and wastage. In cases where the liquid is a corrosive substance such as an acid, or where the liquid is poisonous such as a pesticide, this procedure may be dangerous. Conventional liquid dosing devices alleviate these problems to an extent but they are known to leak during storage and transportation.

According to the invention there is provided a liquid dosing device for locating about the opening of a container, the device comprising:

a) a chamber, having at least one aperture defined therein to allow liquid out the chamber;

b) a spout, extending through a wall of the chamber, having a first end located toward the top of the chamber and a second end extending beyond the wall of the chamber for locating inside the container; and c) a valve arrangement which comprises a cap and a holding means to move the cap between a storage position whereby the cap is held in sealing contact with the first end of the spout and an operative condition whereby the cap is held off the first end of the spout to allow liquid exiting the first end of the spout into the chamber.

In a preferred valve arrangement of the invention, the cap comprises a resilient disc and the holding means comprises:

a groove formed in a wall of the chamber into which the resilient disc clips which holds the resilient disc off the first end of the spout;

a lid removably locatable on the chamber; and an abutment, formed on the resilient disc or on the lid, arranged so that on locating the lid on the chamber the abutment forces the cap against the first end of the spout.

According to another aspect of the invention there is provided apparatus for providing a dose of liquid which comprises a container and a device as described above, wherein the chamber and the container are integrally formed and wherein the spout and the wall through which the spout extends are removably attachable to the container and the chamber.

Preferably a throat portion is provided between the chamber and the container, and the wall through which the spout extends is a plug which plugs into the throat portion.

BRIEF DESCRIPTION OF THE DRAWINGS

The invention will now be described in more detail, by way of example only, with reference to the accompanying drawings in which FIG. 1 shows a liquid dosing device according to the invention;

FIG. 2 shows a sectional side view of an alternative embodiment of a valve arrangement which forms part of a liquid dosing device according to the invention;

FIG. 3 shows a sectional side view of an alternative embodiment of a spout which forms part of a liquid dosing device according to the invention; and FIG. 4 shows apparatus according to the invention for providing a dose of liquid.

DESCRIPTION OF AN EMBODIMENT

Referring to the drawing there is shown a liquid dosing device comprising a chamber 10, having a threaded skirt 12 which is locatable about a complementally threaded neck of a container opening. There is shown a spout 14 which extends through the bottom wall 16 of the chamber 10 having a first end 18 located toward the top of the chamber 10 and a second end 20 for locating in the container. The device has a valve arrangement which comprises a resilient cap or disc 22 and a holding means which comprises a groove 29 formed in a wall of the chamber 10 and a threaded lid 24 which screws onto the complementally threaded wall 26 of the chamber 10. The resilient cap may be made from a polymeric plastics material. The resilient cap 22 is in this case made from polyethylene plastics material. The resilient cap could for example be made from rubber. The resilient cap 22 has holes 28 formed therein. The resilient cap 22 clips into the groove 29 so that it is held just off the first end 18 of the spout 14. A skirt 19 helps to direct the liquid exiting the first end 18 of the spout 14 downwardly toward the bottom of the chamber 10 and thus to prevent the liquid accidentally exiting the holes 28 formed in the resilient cap 22. The resilient cap 22 has an abutment 40 located thereon. The chamber 10 has graduations marked on it indicating volumetric dosage amounts. A skirt 15 is formed on the outside of the bottom wall 16. This provides a better liquid seal between the container and the device. An ordinary washer could be used instead of the skirt 15.

The liquid dosing device operates as follows. A container is filled with liquid. The container is made from a suitable plastics material. The liquid dosing device is screwed onto the neck of the container. When a particular dose of liquid is required the lid 24 is unscrewed off the chamber 10. The dosing device is now in its operative condition. The container is squeezed and the liquid is forced up the spout 14 from the second end 20 of the spout toward the first end 18 of the spout 14. Because the resilient cap 22 is held off the first end 18 of the spout 14, the liquid is allowed to exit the first end 18 of the spout 14 to allow liquid into the chamber 10. Once the liquid is in the chamber 10 it can simply be poured out via the holes 28 formed in the resilient cap 22. When the container and the dosing device are required to be stored or distributed, the lid 24 is screwed onto the chamber 10. As the lid 24 is being screwed onto the chamber 10, the lid 24 abuts against the abutment 40 on the resilient cap 22 which forces the resilient cap 22 against the first end 18 of the spout 14. At this stage when the lid 24 is fully screwed onto the chamber 10, the resilient cap 22 completely seals the first end 18 of the spout 14. In this storage position, liquid from the container cannot leak into the chamber 10 even if the container is turned upside down or if the container is accidentally bumped.

FIG. 3 shows an alternative spout arrangement. The spout 14 is made of an upper part 25 which forms an integral part of the chamber 10 and a lower part 27 which is insertable into the upper part 25.

FIG. 2 shows a preferable form of resilient cap 22. The resilient cap 22 has a button 21 formed thereon sized to fit into the opening of the first end 18 of the spout 14. This more effectively seals the first end 18 of the spout 14 when the device is in the storage position.

It is preferable that at the point of assembly, prior to distributing such containers, that the container be filled with liquid and the liquid dosing device as described above be securely attached to the container. A ratchet type screw thread arrangement can be used for this purpose. This further prevents the problem of leakage between the container and the liquid dosing device that occurs in unsecure arrangements.

Referring to FIG. 4, there is shown an alternative way of manufacturing the liquid dosing device according to the invention and a container. There is shown an apparatus comprising a chamber 32 and a container 36 made as a single unit with a throat portion 34 formed between the chamber 32 and the container 36. A plug 16 with a spout 14 located therethrough, plugs into the throat portion 34. The plug can easily be removed if required. It is intended that the container and chamber unit with a lid 24 is distributed by the manufacturer with the liquid in the container. The user can use and re-use the same plug and spout on different container and chamber units.

I claim:

1. A liquid dosing device for locating about the opening of a container, the device comprising:

(a) a chamber, having at least one aperture defined therein to allow liquid out the chamber;

(b) a spout extending through a wall defining a bottom of the chamber, the spout having a first end located towards the top of the chamber with an opening defined therein and a second end extending beyond the wall for locating inside the container, the opening being aligned with a longitudinal axis of the Spout; and (c) a valve arrangement, including a disc and separate lid, for blocking and unblocking the opening, the resilient disc mounted in the chamber being disengaged from the opening when released by the lid, the separate lid being attachable to the chamber by a screw thread connection, the lid configured for engaging a portion of the disc to force the disc into sealing engagement with the opening in response to the lid being screwed onto the chamber, and for releasing the disc in response to the lid being unscrewed, the disc including a protrusion facing the opening and shaped to fit therein when the disc is forced into sealing engagement with the opening.

2. The liquid dosing device according to claim 1, wherein the disc is inherently biased for disengagement from the opening and disengages itself from the opening upon being released by the lid.

3. The liquid dosing device according to claim 1, wherein the chamber includes a surface surrounding the first end of the spout, a groove formed in the surface, an outer periphery of the disc being retained in the groove.

4. The liquid dosing device according to claim 2, wherein the groove extends continuously annularly, the outer periphery of the disc being annular and received in the groove, the disc including at least one hole for enabling liquid to flow,past the disc and through the aperture.

5. The liquid dosing device according to claim 1, wherein the disc is formed of a polymeric plastics material.

6. The liquid dosing device according to claim 1, further including a liquid-storage container, the chamber being of integral one-piece construction with the container, and the spout and the wall being removable from both the container and the chamber.

7. The liquid dosing device according to claim 6, wherein the container includes a throat portion disposed below the chamber, the wall comprising a plug which fits into the throat portion.

* * * * *